April 13, 1926.

R. SCHRAMM

WORK TABLE FOR MARKING MACHINES

Filed May 8, 1922

2 Sheets-Sheet 1

1,580,171

Inventor
Richard Schramm
By Brockett & Hyde
Attys

April 13, 1926.
R. SCHRAMM
WORK TABLE FOR MARKING MACHINES
Filed May 8, 1922   2 Sheets-Sheet 2
1,580,171
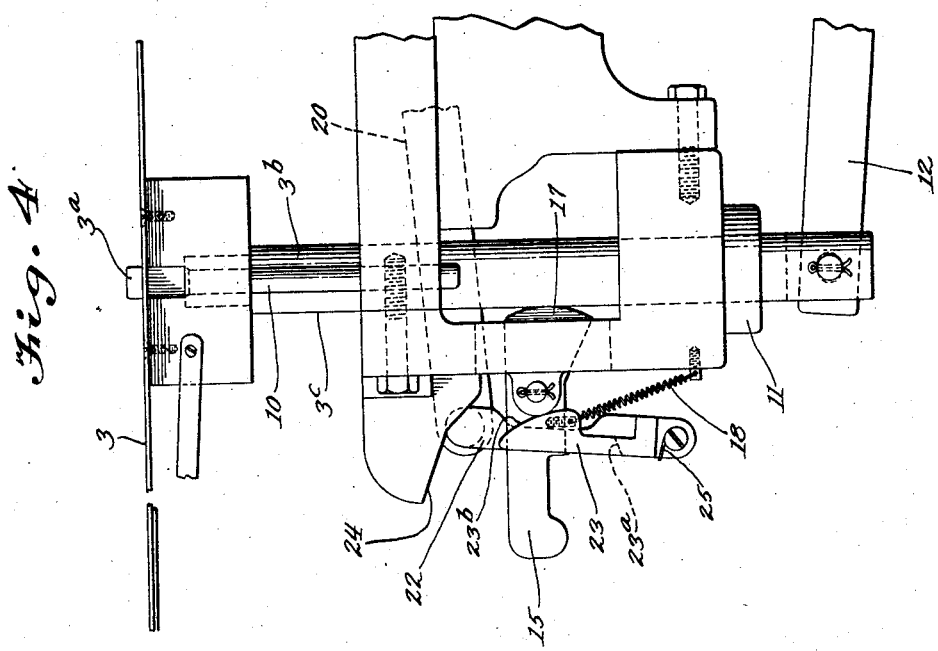
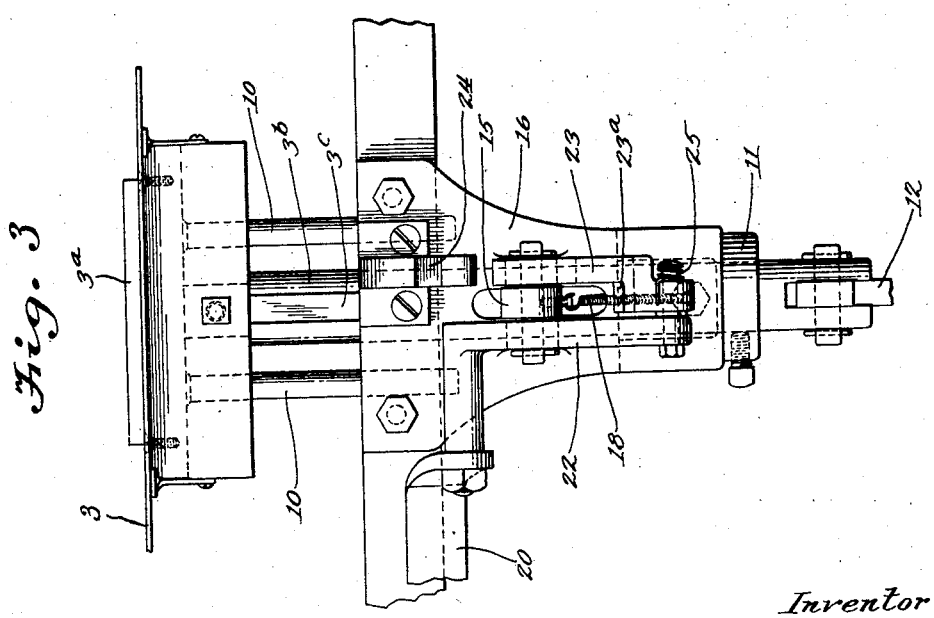
Inventor
Richard Schramm
By Brockett & Hyde
Att'ys Patented Apr. 13, 1926.

1,580,171

UNITED STATES PATENT OFFICE.

RICHARD SCHRAMM, OF CINCINNATI, OHIO, ASSIGNOR TO THE NATIONAL MARKING MACHINE COMPANY, OF CINCINNATI, OHIO, A CORPORATION OF OHIO.

WORK TABLE FOR MARKING MACHINES.

Application filed May 8, 1922. Serial No. 559,444.

*To all whom it may concern:*

Be it known that I, RICHARD SCHRAMM, a citizen of the United States, residing at Cincinnati, in the county of Hamilton and State of Ohio, have invented certain new and useful Improvements in Work Tables for Marking Machines, of which the following is a specification.

This invention relates to improvements in marking machines used for instance to mark clothing in laundries.

Reference is had to the patent to Canine No. 1,063,180 of June 3, 1913, for "marking machine" for a fuller understanding of the present invention. In the Canine patent there is provided a support for the work to be marked and a power operated mechanism for marking the work. The present invention relates to the same type of machine as disclosed in the Canine patent cited above.

According to my present invention the pieces of work are arranged in a pile upon the work table so that the marking device will mark the topmost piece of work. Obviously, as the topmost piece of work is stamped or marked, the next underlying piece of work will occupy a lower position unless some means is provided for raising the table after each operation so as to always present each succeeding piece of work in the same plane for the marking operation.

It is therefore the object of this invention to provide a power marking machine with an automatically adjustable table for supporting the work; so that as one piece of work is marked and removed, the table will be automatically raised sufficiently to bring the next piece of the pile of work to the proper level for the marking operation.

More particularly, it is the object of this invention to provide such a mechanism which is automatically actuated by the operation of the marking machine.

Further objects of the invention will be apparent from the following description and claims when considered together with the accompanying drawings.

Figure 1:
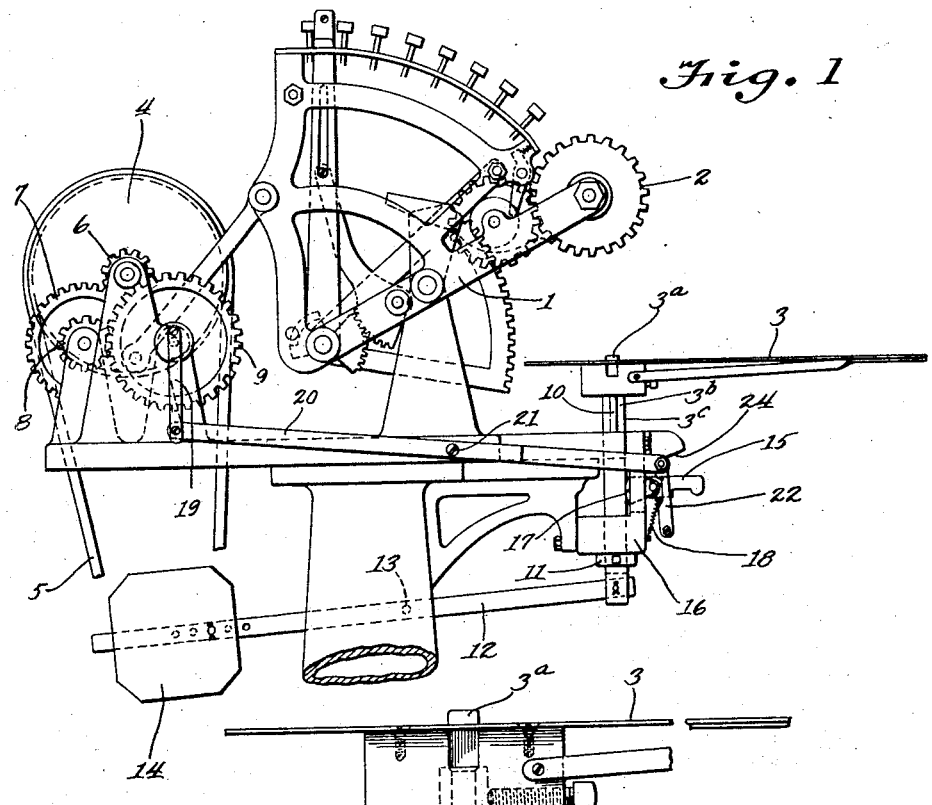
Figure 2:
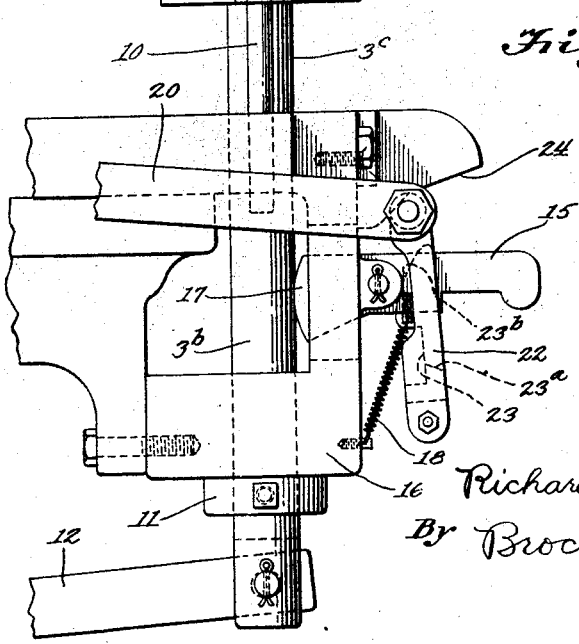

Fig. 1 is a side elevation of a power marking machine embodying my present improvement; Fig. 2 is a detail view of a part of Fig. 1 showing the mechanism for automatically raising the work support step by step; Fig. 3 is a front elevation of the same mechanism illustrated in Fig. 2; and Fig. 4 is a side elevation of the same mechanism illustrated in Fig. 2 but taken at 180° therefrom.

The type of power marking machine to which the present invention relates is substantially the same as that illustrated in the Canine patent cited above. As will be seen by reference to the Canine patent the rock arm 1 which carries the type disks 2 is rocked downwardly and upwardly toward and away from the work table 3 through operative connections from the driving pulley (not shown) which drives pulley 4 by means of the belt 5. Pulley 4 drives the pinion 6 which meshes with the gear 7 for operation of the pinion 8 and the gear 9.

According to this invention, the work table 3 which carries the rubber platen 3ª is provided with a plunger shaft 3ᵇ having a flat side 3ᶜ so as to maintain the plunger shaft during its vertical movement against any rotary turning. Guide rods 10 are also provided upon the under side of the table and extend through the frame of the machine for the purpose of guiding the work table in its raising movements. The plunger shaft is provided near its lower end with a collar 11 to engage the frame of the machine so as to limit upward movement of the work table as it is intermittently raised to present the successive pieces of work to the proper elevation for effectual marking by the type disks. The extreme lower end of the plunger shaft has pivotally connected thereto a weight lever 12 which is pivoted at 13 to the pedestal of the machine frame and has adjustably mounted near the free end thereof a weight 14 which normally tends to force the work table upwardly. The upward tendency of the weight, however, is restrained by means of an eccentric stop pawl 15 which is pivoted in a bracket 16 provided therefor upon the machine base and which has its toe 17 adapted for engagement with the plunger shaft so as to prevent upward movement thereof. The coil spring 18 is provided with one end anchored to the stop pawl bracket and its other end secured to the stop pawl outside of the pivotal axis thereof so as to normally cause binding action of the stop pawl against the side of the plunger shaft.

The crank arm 19 which is operated by the gear 9 and which is pivotally connected at its one end to the crank lever 20 is adapted to rock the crank lever upon its pivot point 21 so as to operate the crank lever link 22 pivotally connected to one end of the crank lever and which carries at its other end the trip pawl 23 pivotally mounted thereon. The trip pawl 23 has a pawl portion 23$^a$ and a curved cam portion 23$^b$.

After the type disks have been lowered to mark a piece of work and are being raised in the ordinary operation of the machine, the trip pawl 23 will be raised through the crank lever connections above described so as to cause the portion 23$^a$ to engage the under-face of the full portion of the stop pawl 15 and rock the same about its pivot point, thereby causing the toe 17 of the same to be lowered and to free the plunger shaft of the work table. The upward movement of the trip pawl 23 will continue until the upper cam portion 23$^b$ of the trip pawl engages the cam 24 provided upon the frame of the machine; and during this interval of time the weight through this lever connection will exert sufficient force to cause the plunger shaft to move upwardly and to raise the work table carrying the work.

As soon, however, as the trip pawl is moved outwardly to the right as viewed in Fig. 2 of the drawings, permitting the pawl portion 23$^a$ to move into the recess or cut out portion of the stop pawl, the stop pawl 15 is freed and is permitted to again grip the plunger shaft under the influence of the tension spring 18. These parts are so constructed and arranged that upon operation of the same in the manner just described the work table will be raised sufficiently to bring the successive pieces of work on the top of the pile to proper elevation for marking by the type disks. Then upon lowering movement of the type disks the crank lever 20 will move in the opposite direction so as to cause the trip pawl to move downwardly to its initial position to be ready for the next release of the stop pawl. The spring 25 about the pivotal axis of the trip pawl tends to force the same toward the machine, that is, in a direction toward the left as viewed in Fig. 2 of the drawing, thereby returning the trip pawl to such a position that upon again raising the same it will engage the full portion of the stop pawl so as to trip the same.

Thus it will be seen that I have devised a machine organization in which a pile of work may be placed upon the work table with the uppermost piece in proper position for the marking operation. Then when the topmost piece of work has been marked and while the type disks are being raised away from the work table, the remaining pieces of work will be automatically raised sufficiently to bring the next piece of work which is now on the top of the pile to proper elevation for successful stamping by the type disks in the marking operation. This operation is continued until the pile of work has all been marked.

What I claim is:—

1. In a marking machine, the combination of a work supporting means, means for marking the work, means normally tending to force said work supporting means towards said marking means, means for restraining said work supporting means against movement and means for releasing said restraining means to permit advancing movement of the work supporting means towards the marking means, said releasing operation being effected during the idle period of said marking means.

2. In a device of the class described, an adjustable work support, means for moving said support, said support having a post, a stop pawl adapted to engage and disengage said post for locking and releasing the work support, means tending to normally force said pawl into engagement with said post, means for effecting disengagement of said pawl from said post, and additional means for releasing said pawl from the action of said last named means so as to permit the same to return to engagement with said post, all of said means being so constructed and arranged as to operate according to a definite and predetermined cycle of time.

3. In a device of the class described, an adjustable work support, means for moving said support, said support having a post, a stop pawl adapted to engage and disengage said post for locking and releasing the work support, means tending to normally force said pawl into engagement with said post, trip means for effecting disengagement of said pawl from said post, and means adapted to be engaged by said trip means for automatically terminating the action thereof so as to permit the pawl to return to engagement with said post.

4. In a marking machine, the combination of a table for supporting pieces of work, means for marking the pieces of work as they are advanced, means for automatically advancing the work so as to present each piece of work in substantially the same plane for the marking operation, and means for preventing movement of said table during each marking operation.

5. In a marking machine, the combination of a work supporting means, means for marking the work, means normally tending to force said work supporting means towards said marking means, means for restraining said work support against movement, means for releasing said restraining means to permit advancing movement of the work support towards the marking means, and means for locking said table against movement during each marking operation.

6. In a device of the class described, an adjustable work support, means for moving said support, said support having a post, a stop pawl pivotally mounted upon a fixed part of the frame and adapted to engage and disengage said post for locking and releasing the work support, means tending to normally force said pawl into engagement with said post, trip means for effecting disengagement of said pawl from said post, and fixed means adapted to be engaged by said trip means for automatically terminating the action thereof so as to permit the pawl to return to engagement with said post.

7. In a marking machine, the combination of a work supporting means, marking means for the work upon said supporting means and movable toward and from said supporting means, and means for automatically adjusting said supporting means toward said marking means during the movement of said marking means away from said supporting means.

In testimony whereof I hereby affix my signature.

RICHARD SCHRAMM.